(12) United States Patent
Forshier et al.

(10) Patent No.: US 9,476,342 B2
(45) Date of Patent: Oct. 25, 2016

(54) THERMAL DISPLACEMENT COMPENSATION ASSEMBLY FOR A WORK VEHICLE PRIME MOVER

(71) Applicant: DEERE & COMPANY, Moline, IL (US)

(72) Inventors: Adam Forshier, Cedar Falls, IA (US); Gary M. Frodsham, Waterloo, IA (US); Paul M. Wynthein, Waterloo, IA (US); Terry W. Schwickerath, Parkersburg, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/556,466

(22) Filed: Dec. 1, 2014

(65) Prior Publication Data

US 2016/0153341 A1    Jun. 2, 2016

(51) Int. Cl.
*A47F 5/00* (2006.01)
*F01N 13/18* (2010.01)
*F01N 13/10* (2010.01)
*F16M 13/02* (2006.01)

(52) U.S. Cl.
CPC ........... *F01N 13/1811* (2013.01); *F01N 13/10* (2013.01); *F16M 13/02* (2013.01)

(58) Field of Classification Search
CPC ... F01N 13/1805; F01N 13/1822; F02K 1/04
See application file for complete search history.

(56) References Cited

U.S. PATENT DOCUMENTS

| | | | |
|---|---|---|---|
| 3,237,716 A * | 3/1966 | Parsons | F01N 13/14 138/178 |
| 5,671,927 A * | 9/1997 | Schweiger | F16J 15/123 277/630 |
| 6,845,984 B2 * | 1/2005 | Doyle | F16J 15/061 277/317 |
| 6,974,137 B2 | 12/2005 | Beutter et al. | |
| 2014/0097575 A1 | 4/2014 | Schumacher et al. | |
| 2014/0137818 A1 | 5/2014 | Ko et al. | |
| 2014/0230765 A1 | 8/2014 | Laichinger et al. | |

* cited by examiner

*Primary Examiner* — Amy Sterling (57) ABSTRACT

A thermal displacement compensation assembly for an engine system including a cylinder head and an exhaust manifold coupled to the cylinder head. The thermal displacement assembly includes a bracket configured to be operatively coupled to cylinder head and to the exhaust manifold and a multi-layer coupler. The multi-layer coupler is configured to be disposed between the bracket and the cylinder head, wherein a first component of the coupler is configured to slide with respect to a second component of the coupler such that relative movement between the bracket and one of the cylinder head and exhaust manifold is enabled by relative movement of the first component with the second component of the multi-layer coupler.

8 Claims, 11 Drawing Sheets

THERMAL DISPLACEMENT COMPENSATION ASSEMBLY FOR A WORK VEHICLE PRIME MOVER

FIELD OF THE DISCLOSURE

The present invention generally relates to a work vehicle having a prime mover to provide power to move the work vehicle, and more particularly to an engine system including a thermal displacement compensation assembly.

BACKGROUND

Agricultural equipment, such as a tractor or a self-propelled combine-harvester, includes a prime mover which generates power to perform work. In the case of a tractor, the prime mover is gas powered engine or a diesel engine that generates power from a supply of fuel. The engine drives a transmission which moves wheels or treads to propel the tractor across a field. In addition to providing power to wheels through a transmission, tractors often include a power takeoff (PTO) which includes a shaft coupled to the transmission and which is driven by the engine.

In both gas powered and diesel powered engines, the amount of work performed not only includes moving the vehicle along a road or field, but delivering power to a wide variety of accessories driven the engine and often by the PTO. The PTO of agricultural equipment drives what is known as farm implements or attachments including discs, spreaders, combines, or bailers. Some work vehicles include a hydraulic machine having a hydraulic pump which can be used, for instance, to raise or lower a piece of equipment such as a mower. In other embodiments, the PTO can be coupled to a number of different types of equipment, including but not limited to log splitters, pumps, concrete mixers, mulchers, chippers, balers, harvesters, spreaders, and sprayers.

Other work vehicles having prime movers include construction vehicles, forestry vehicles, lawn maintenance vehicles, as well as on-road vehicles such as those used to plow snow, spread salt, or vehicles with towing capability. While each of the work vehicles, including the agricultural equipment described above, often include gas powered combustion engines as the prime mover, many of the work vehicles use diesel engines, due in part to the higher torque available from a diesel engine.

Current engines include a large number of complex air control systems directed to controlling airflow into and out of the engine to provide increased fuel efficiency, as well as to reduce the amount of pollutants generated by the engine. Because power from the engine must be provided not only for moving the vehicle, but for powering other equipment or accessories as well, the design of engine systems, engine components and engine subsystems take into account the control the operating temperature of the engine systems and the related components. Consequently, the increased demands for a work vehicle to deliver power require that the temperatures of the engine and subsystems should be adequately compensated for and/or controlled.

Significant challenges exist in an engine system where brackets are located adjacent to or between heat-sensitive components in the high temperature air systems. Not only is temperature control important, consideration of the engine system resonant frequencies with respect to engine firing frequencies should also be considered. Another consideration is to provide a system having a sufficiently rigid or stiff design which achieves engine and engine system resonant frequency goals, while still allowing sufficient compliance to enable relative thermal displacements between components. Otherwise, high thermal strains are produced, which can lead to thermal fatigue failures. Prior designs have faced significant challenges in this area, but have only provided limited solutions. Consequently, what is needed therefore is an engine system which reduces thermal strains and mitigates thermal fatigue risks.

SUMMARY

In one embodiment of the disclosure, there is provided a coupler for coupling a support bracket to an exhaust manifold of an engine system with one or more fasteners. The coupler includes a sleeve and a sliding element. The sleeve includes a first surface, a second surface, and a first plurality of apertures configured to provide through access from the first surface to the second surface, wherein each of the plurality of apertures is configured to receive at least one of the fasteners. The sliding element includes a second plurality of apertures, wherein the sliding element is configured to be in sliding contact with the first surface of the sleeve such that the second plurality of apertures is disposed adjacently to the first plurality of apertures.

In another embodiment of the disclosure, there is provided a thermal displacement compensation assembly for an engine system including a cylinder head and an exhaust manifold coupled to the cylinder head. The thermal displacement compensation assembly includes a bracket and multi-layer coupler. The bracket is configured to be operatively coupled to the cylinder head and to the exhaust manifold. The multi-layer coupler is configured to be disposed between the bracket and the cylinder head, wherein a first component of the coupler is configured to slide with respect to a second component of the coupler such that relative movement between the bracket and one of the cylinder head and exhaust manifold is enabled by relative movement of the first component with the second component of the multi-layer coupler.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

For the purposes of promoting an understanding of the principles of the novel invention, reference will now be made to the embodiments described herein and illustrated in the drawings with specific language used to describe the same. It will nevertheless be understood that no limitation of the scope of the novel invention is intended. Such alterations and further modifications of the illustrated apparatus, assemblies, devices and methods, and such further applications of the principles of the novel invention as illustrated herein, are contemplated as would normally occur to one skilled in the art to which the novel invention relates.

Figure 1:
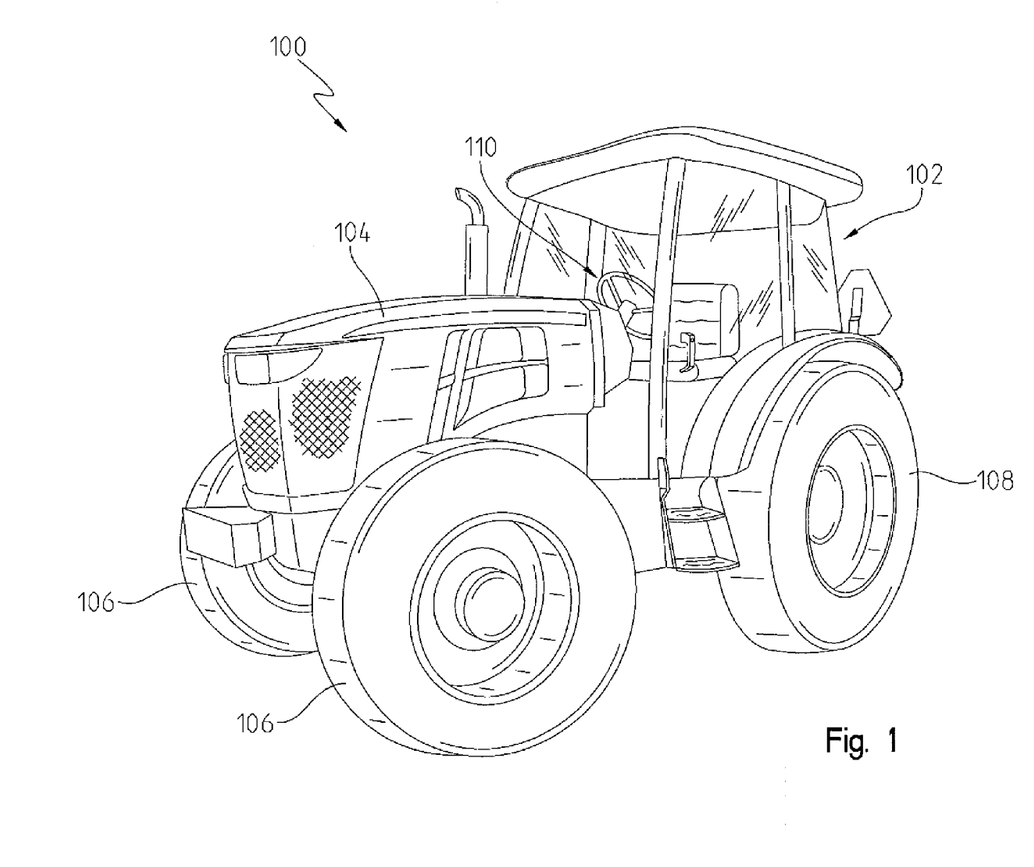
FIG. 1 is a side perspective view of a work machine.

The present disclosure is not exclusively directed to any type of machine or tractor, but rather extends to other powered vehicles as well. For exemplary and illustrative purposes, the present disclosure focuses on a utility tractor 100. In FIG. 1, for example, a work machine 100, such as the 6215R Tractor manufactured and sold by Deere & Company, includes a cab 102 where an operator controls the operation of the machine 100. The machine 100 includes an outer frame 104 to which a front and rear axle (not shown) are connected. The front axle engages a pair of front ground engaging means 106 (e.g., wheels) mounted thereto and the rear axle engages a pair of rear ground engaging means 108 (e.g., wheels) mounted thereto. Operator controls 110, such as a steering wheel, shift lever, shift buttons, dashboard display, etc., are disposed in the cab 102. One or more of these operator controls 110 is operably coupled to the machine's drive train (not shown) for controlling the operation of the machine 100. An engine system 112 (see FIG. 2) is supported by the frame 104 and propels the machine 100 and drives a power take off (PTO) not shown.

Figure 2:
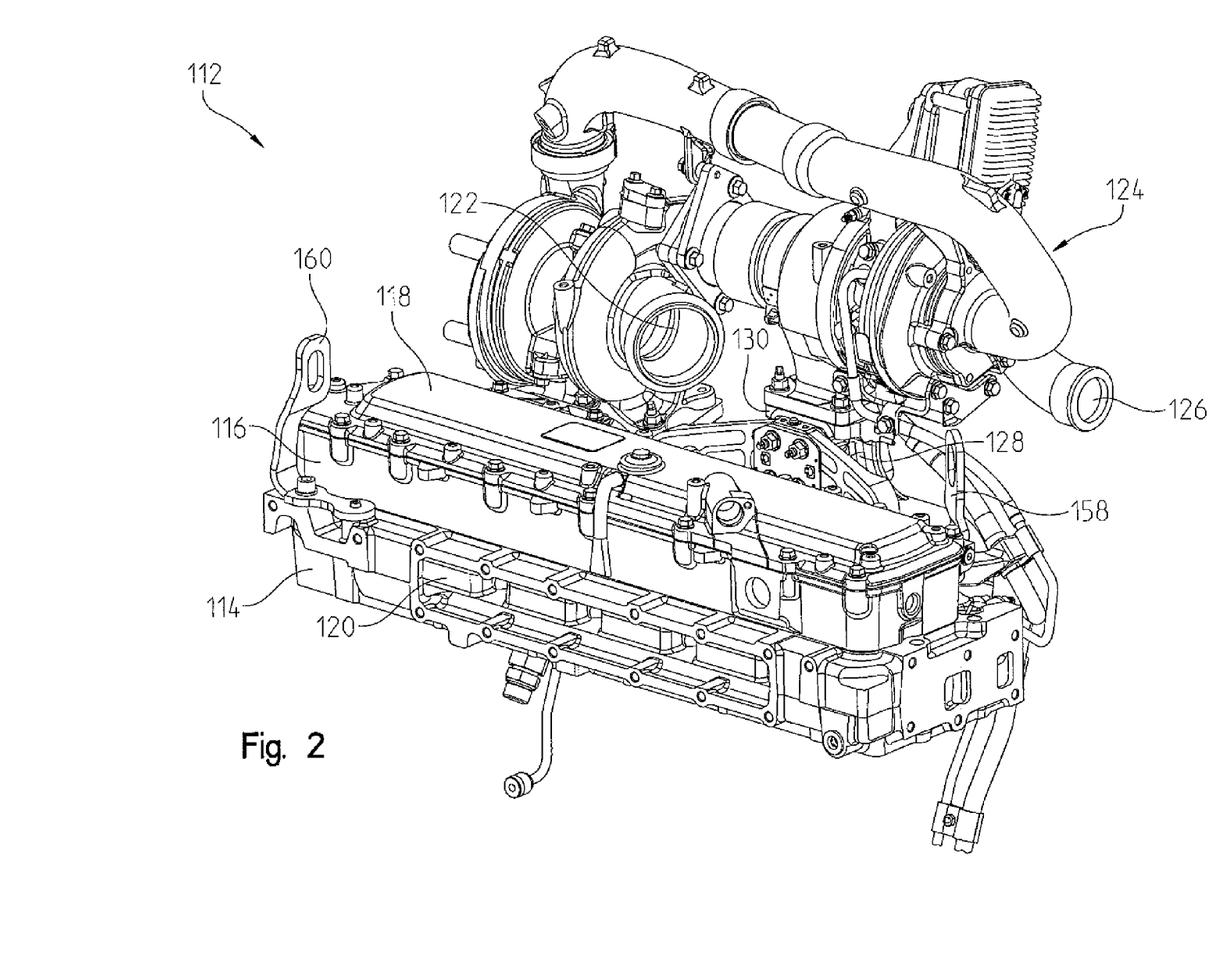
FIG. 2 is a side perspective view of an engine system.

As illustrated in FIG. 2, the engine system 112 includes a cylinder head 114 coupled to a cylinder block (not shown) which is operatively connected to a valve train carrier 116 covered by a valve train cover 118, as is understood by one skilled in the art. The cylinder head 114 includes an air intake chamber 120 which is configured to receive air from both an air intake (not shown) and an output 122 of a turbocharger system 124, which also includes a discharge output 126. The operation of the turbocharger and its related components are known.

The cylinder head 114, in different embodiments, is made of cast iron or aluminum. Other materials are also used, as is known by those skilled in the art. An exhaust manifold 128 is operatively connected to an air outlet of the cylinder head 114 by a plurality of connectors, typically bolts, which rigidly fix the location of the exhaust manifold 128 to the cylinder head 114. The turbocharger system 124 is operatively connected to an output 130 of the exhaust manifold 128.

Figure 3:
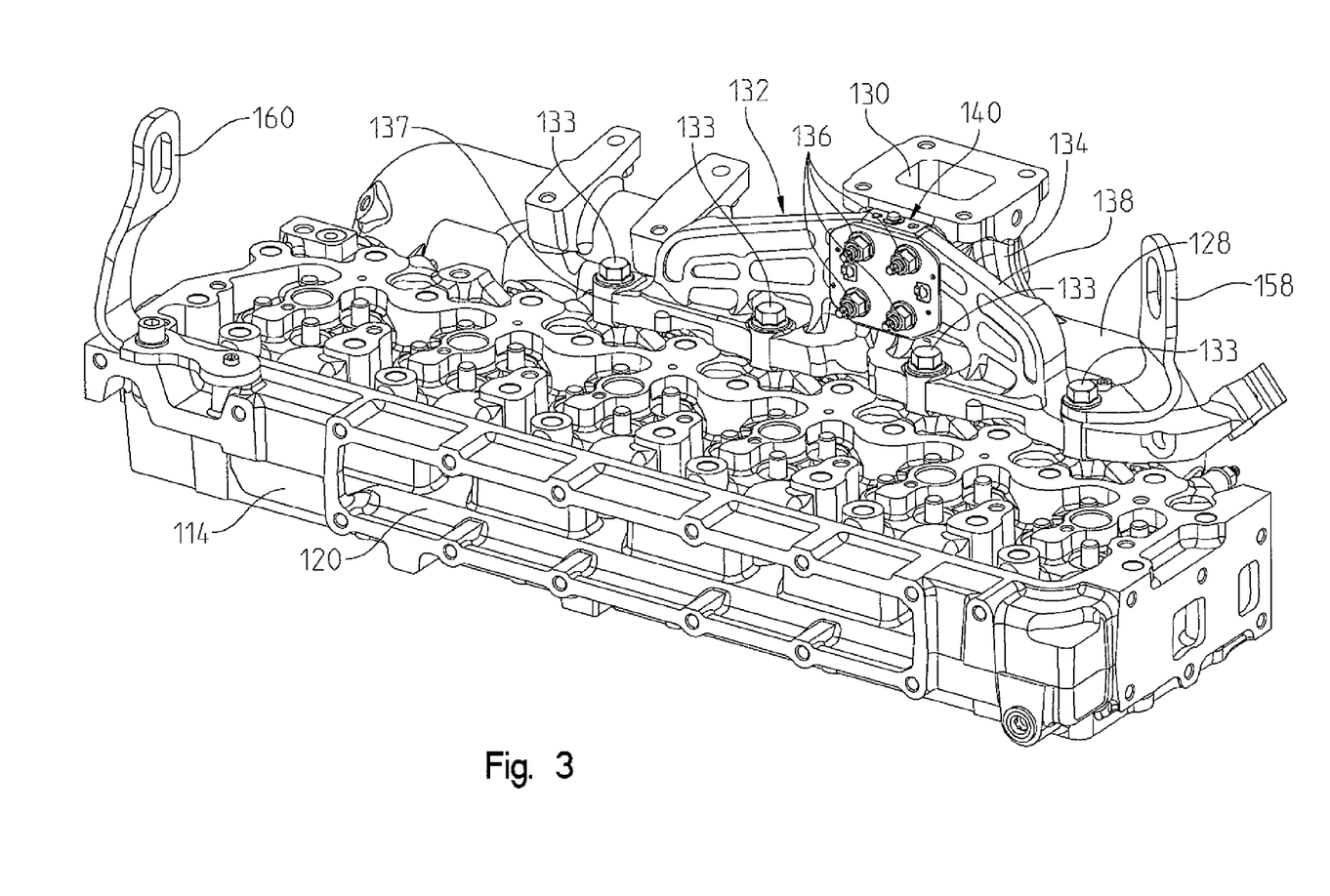
FIG. 3 is a side perspective view of a cylinder head, a bracket, a coupler, and an exhaust manifold.
Figure 4:
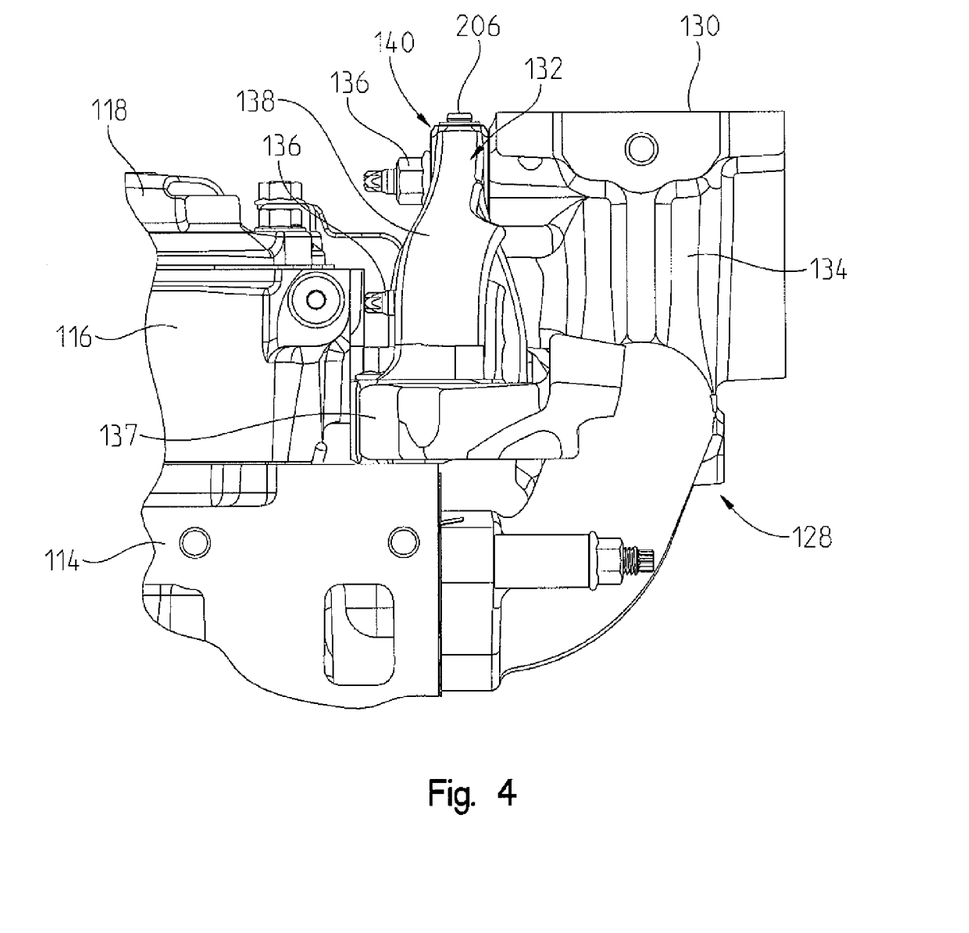
FIG. 4 is a partial end view of a cylinder head, a bracket, a coupler and an exhaust manifold.

As further illustrated in FIG. 3, the valve train carrier 116 and the valve cover 118 have been removed from the cylinder head 114 to illustrate a location and a front perspective view of a bracket 132, which is shown operatively connected to the cylinder head 114. The bracket 132 is coupled to the cylinder head by a plurality of fasteners 133. In one embodiment, the plurality of fasteners 133 are 12.9 phosphate and oil coated fasteners to couple the bracket 132 to the cylinder head 114. In FIG. 4, the valve train carrier 116, valve cover 118, and bracket 132 are illustrated from a partial side view to show the relative location of each of the components. In one embodiment, the bracket is a high silicon molybdenum (SiMo) ductile iron bracket.

The bracket 132 is located adjacently to an upwardly extended portion 134 (as illustrated) of the exhaust manifold 128. The bracket 132 is operatively connected by a plurality of fasteners 136 to the manifold 128. Consequently, the bracket 132 is coupled to both the cylinder head 114 through a base portion 137 of the bracket 132, and to the exhaust manifold 128, through an upwardly extending portion 138. The bracket 132 is configured to provide support for the exhaust manifold 128 during operation of the engine system 112. A coupler 140, located at the upwardly extending portion 138 of the bracket 132, is configured to receive the plurality of fasteners 136 which extend through the coupler 140, the upwardly extending portion 138, and into apertures located in the manifold extended portion 134.

The coupler 140 provides a thermal growth decoupling assembly or decoupling element for the air system which includes the exhaust manifold 128 and the turbocharger system 124. The components of each of the manifold 128 and the turbocharger system 124 are subjected to different rates of thermal expansion and contraction during operation due in part to the material compositions and configuration of the components. The coupler 140 is configured to enable relative the thermal growth between the components in the engine system 112 in order to reduce the impact of thermal strains on components that could lead to potential part or component failures. The bracket 132, while operatively connected to the cylinder head 114, is not coupled to the adjacently located valve train carrier 116 in this embodiment. See FIG. 4. Consequently thermal expansion of the temperature affected components, and in particular the exhaust manifold 128, are not significantly limited by the valve train carrier 116.

Additionally, the coupler 140 and the bracket 132 provide a sufficiently stiff bracket system between components which raises the engine system's resonant frequencies above the engine cylinder firing frequencies, in order to mitigate vibration related failures and other potentially damaging defects which may arise over a period of time. The coupler 140 functions as a decoupling element between components in the engine system to enable a relative thermal displacement between system components in order to reduce thermal strains and to mitigate thermal fatigue risk.

Figure 5:
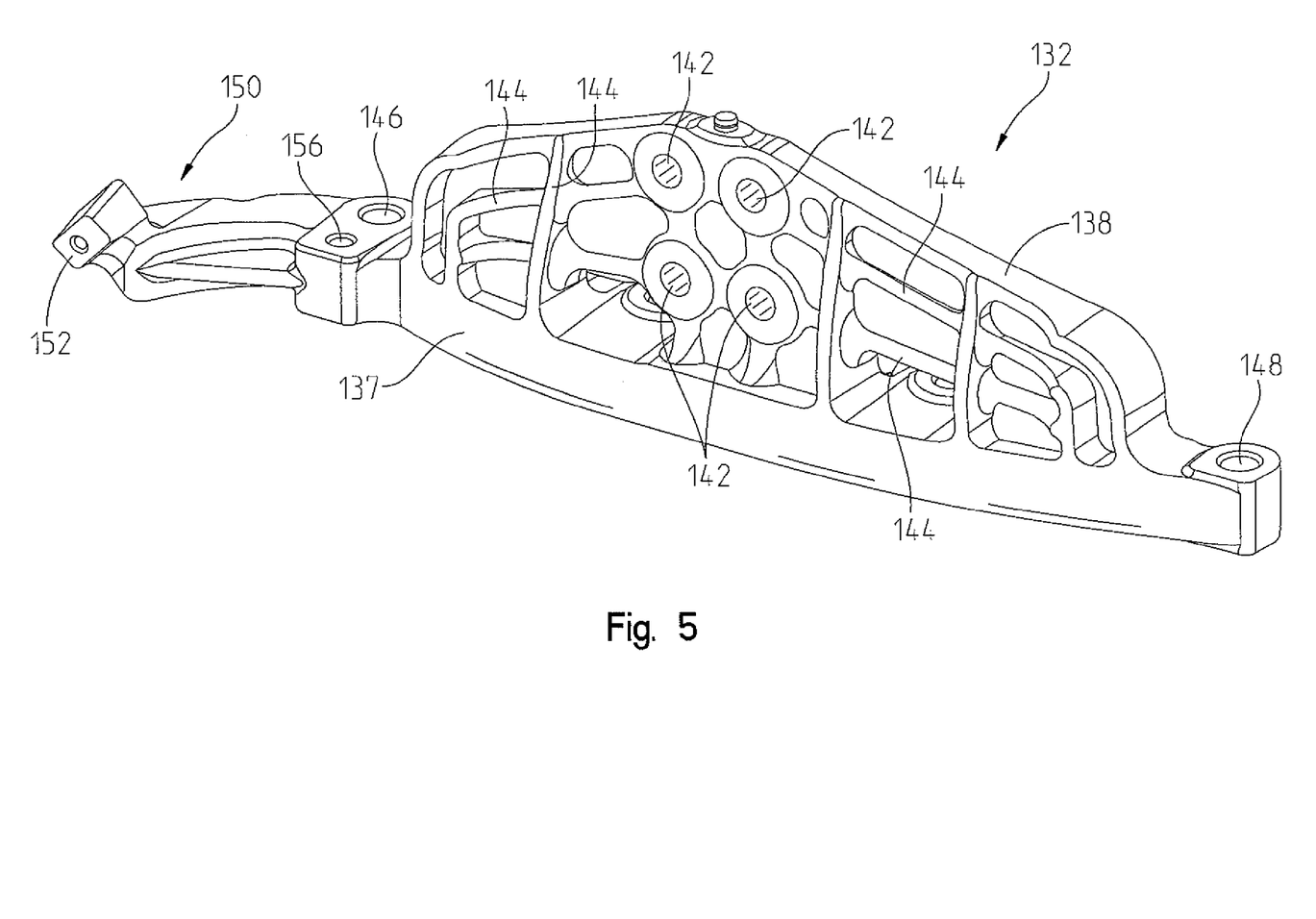
FIG. 5 is a rear perspective view of a bracket.
Figure 6:
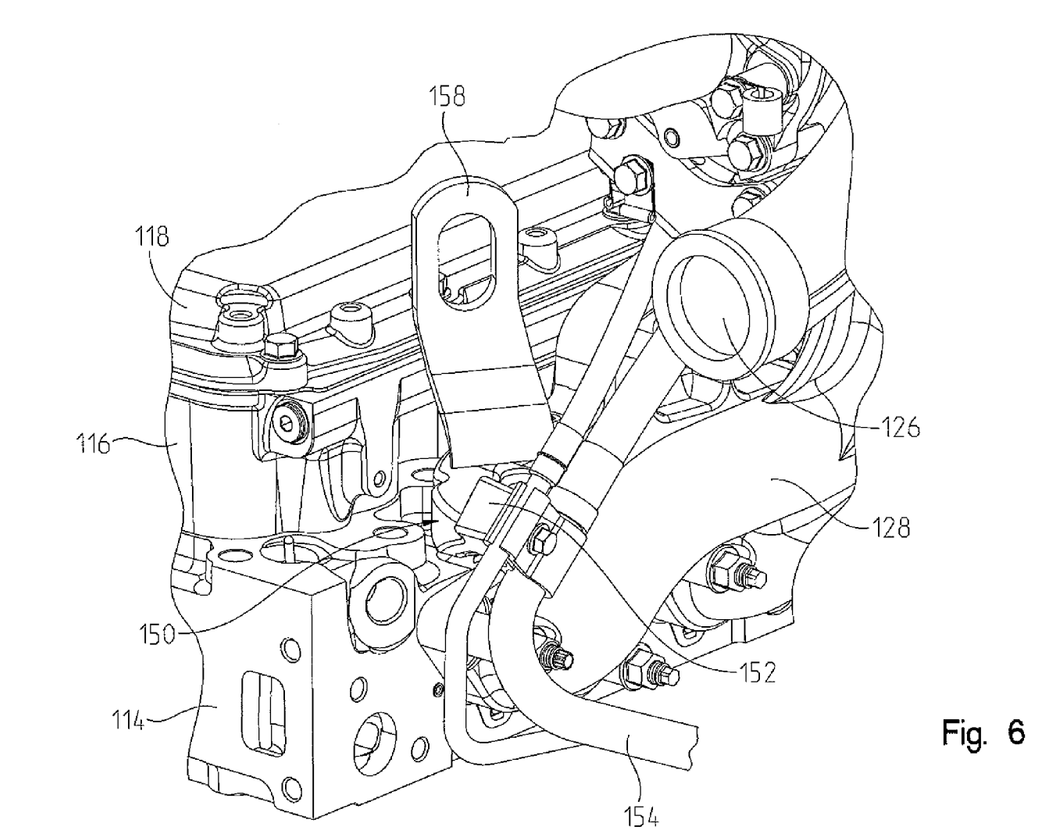
FIG. 6 is a partial perspective view of a cylinder head, a valve train carrier, a valve cover, an exhaust manifold, and a bracket.

FIG. 5 illustrates a rear perspective view of the bracket 132 including a plurality of apertures 142 extending through the upward portion 138 and into which the fasteners 136 extend. The upwardly extending portion includes a plurality of reinforcing ribs 144 disposed along the length and the height of the bracket 132 which are configured to provide a rigid support structure for the exhaust manifold 128. The bracket 132 further includes a first aperture 146 and a second aperture 148, each of which receive fasteners 133 to operatively connect the bracket 132 to the cylinder head 114. Two additional apertures are included in the base portion 137, both of which also receive fasteners 133 as seen in FIG. 3. The bracket 132 also includes a mounting portion 150 which extends along the length of the bracket 132 and which includes an integrated mount 152 configured to mount a hose 154 of the turbocharger system 124. See FIG. 6. The bracket 132, in different embodiments, includes one or more integrated mounts configured to stably locate components of the engine system 112. The bracket 132 further includes an aperture 156 to which an engine lift strap 158 is located as illustrated in FIGS. 3 and 6. Another engine lift strap 160 is located at the cylinder head 114 of FIG. 3.

Figure 7:
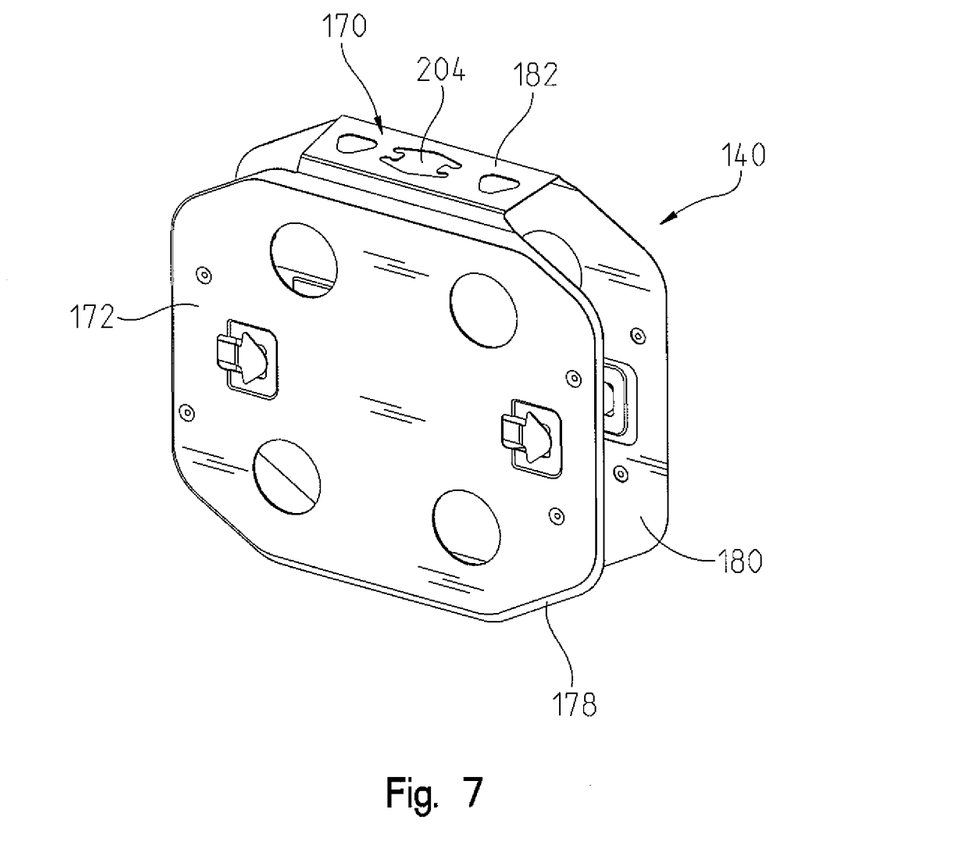
FIG. 7 is a perspective view of a coupler.
Figure 8:
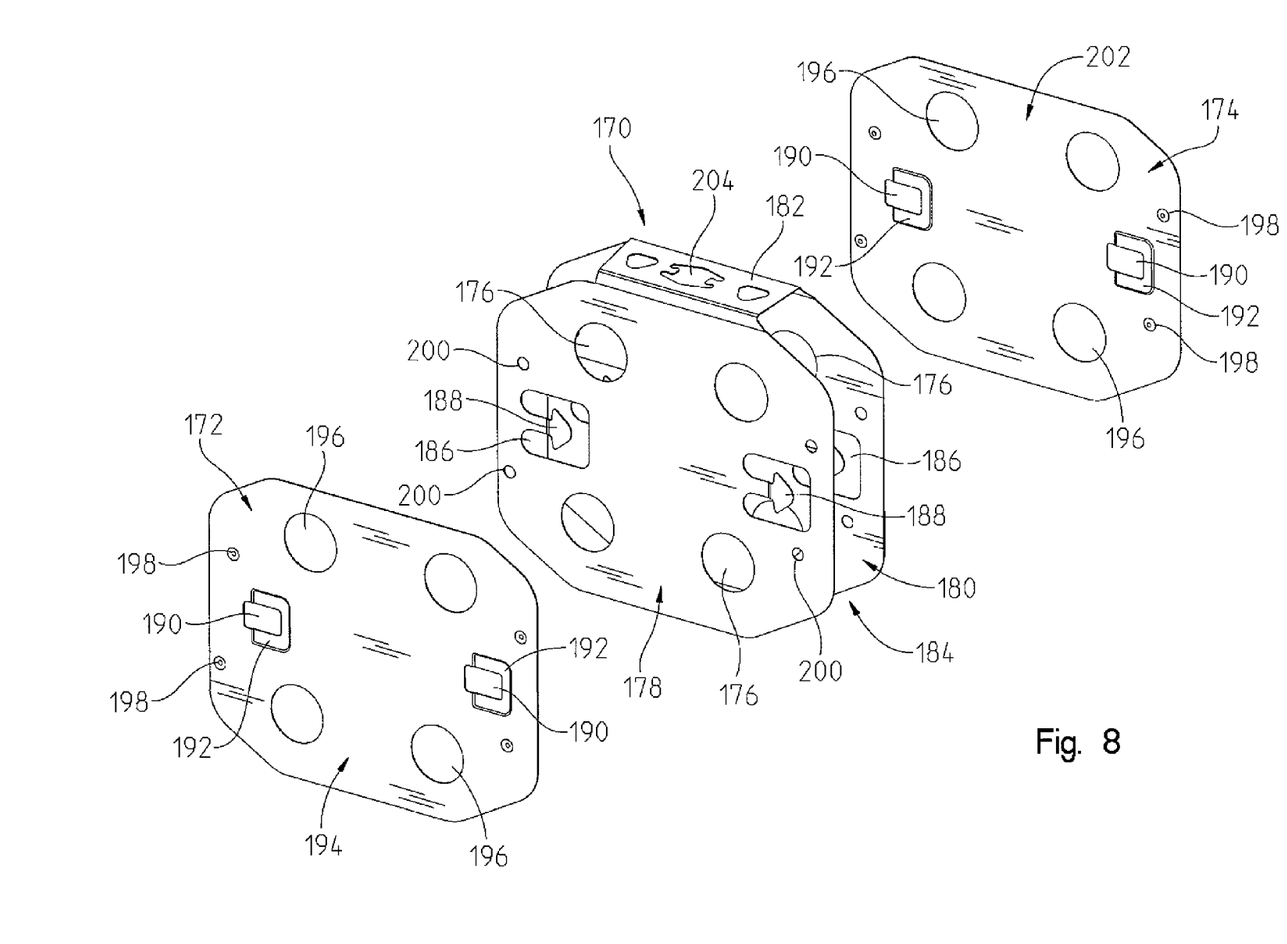
FIG. 8 is an exploded perspective view of a coupler.

FIGS. 7 and 8 illustrate one embodiment of the coupler 140 including a sleeve 170, or inner layer, a first sliding element 172, or first outer layer, and a second sliding element 174, or second outer layer. The sleeve 170 includes one or more apertures 176 which are disposed in a first side wall 178 and a second side wall 180. An end wall 182 is disposed between and at the ends of each of the first side wall 178 and the second side wall 180. In one embodiment, the sleeve 170 is formed of sheet steel to form a unitary single element which is bent at right angles at the intersections between the end wall 182 and the first and second side walls 178 and 180. A space 184 is thereby formed, which is configured to receive the upwardly extending portion 138 of the bracket 132.

Each of the first side wall 178 and second side wall 180 includes one or more locator apertures 186, each of which includes a locator or tab 188 configured to engage corresponding apertures 190 of the first and second sliding members 172 and 174. The tab 188 extends along the plane of the walls and extends into the apertures 186. The apertures 190 are configured to include a recessed portion 192 formed in the sliding member by a stamping operation applied to the sliding member. The recessed portion 192 is recessed with respect to a surface 194 of the sliding member which is configured to receive the tab 188. Assembly of the first and second sliding elements 172 and 174 respectively to first and second side walls 178 and 180 includes insertion of the tab 188 into the aperture 190 until a portion of the tab 188 contacts the recessed portion 192.

The first and second sliding elements 172 and 174 each include a plurality of fastener receiving apertures 196 which are configured to receive the fasteners 136 as previously described. When tabs 188 engage corresponding apertures 190 and/or recessed portion 192, the fastener receiving apertures 196 are located at the apertures 176. By alignment of the apertures 196 with the apertures 176, the fasteners 136 extend through the first and second sliding elements 172 and 174, first and second side wall 178 and 180, and the bracket 132. The fasteners then engage corresponding threaded apertures in the exhaust manifold 128.

The first and second sliding elements 172 and 174 include protrusions 198 configured to engage depressions or holes 200 of the first and second side walls 178 and 180. The protrusions 198 act as locating features to provide for alignment of the sliding elements 172 and 178 to corresponding side walls 178 and 180.

Each of the first and second sliding elements 172 and 174 is formed of a support material having at least one surface thereof covered with an anti-friction or low friction material. As seen in FIG. 8 for instance, the low friction material is located at side 202 of the sliding element 174. A corresponding facing side of the second side wall 180 is also covered with a low friction material. In one embodiment, each of the first and second sliding elements includes a stainless steel material with a molybdenum disulfide coating placed or deposited on the facing surfaces thereof. The molybdenum disulfide coating is also placed or deposited at the facing surface of the second wall 180. Each of the first and second sliding elements 172 and 174 has a coated surface which therefore faces a coated surface of the facing surface of the first and second walls 178 and 180. A sliding interface is consequently provided between the sleeve 170 and the sliding elements 172 and 174 to enable the sliding elements to move with respect to the sleeve 170. In other embodiments, the sliding element is made of a first material which includes anti-friction properties to provide a sliding interface with the sleeve 170 which is made a second material. In other embodiments, different coatings are applied to each of the sleeve 170 and the sliding elements to provide the sliding interface.

The sleeve 170 includes a hole 204 located at the end wall 182. The hole 204 is configured to receive a fastener 206 (see FIG. 4) which fixes the location of the sleeve 170 with respect to the bracket 132. The sliding elements 172 and 174 move with respect to the fixed sleeve 170 upon thermal expansion and contraction of the engine system components, and in particular the exhaust manifold 128.

Figure 9:
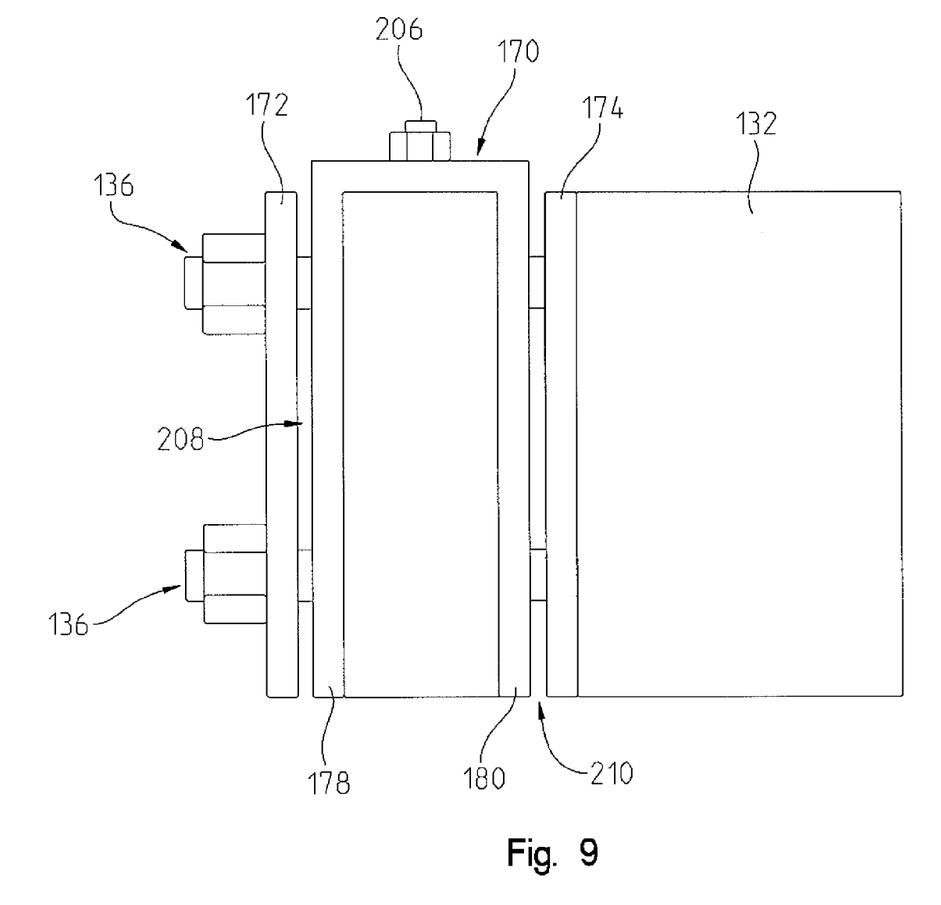
FIG. 9 is a schematic depiction of sliding movement of the sliding elements with first wall and second walls of a coupler.

FIG. 9 is a schematic depiction of sliding movement of the sliding elements 172 and 174 with the first wall and second walls 178 and 180. An illustrative space 208 and an illustrative space 210 are depicted to illustrate the sliding interface between an adjacent sliding element and wall. In practice, the spaces 208 and 210 are contact interfaces at which sliding movement occurs in all directions between the sliding elements and the fixed sleeve. The sliding movement enables both vertical and longitudinal contraction and expansion of the manifold 128 while being heated and while cooling down.

The schematic depiction also shows the extension of the fasteners 136 through each of the components and into the bracket 132. In one embodiment, the fasteners are nickel-based alloy fasteners including a bolt and nut which are in tension and which eliminate shear joints. In another embodiment, the fasteners are Inconel 718 fasteners. The apertures 176 and 196 are larger than a diameter of the shaft of the fastener that extends through the sliding elements and sleeve, such that relative sliding movement between the sliding elements and sleeve about the fastener shaft is provided. In general, the aperture size is sufficiently large such that the fastener shaft does not contact the aperture due to the relative thermal growth of the shaft.

The sliding elements 172 and 174 provide a method to control friction which develops in the joint between the bracket 132 and the manifold 128. The coated surfaces slide relative to each other and allow for relative thermal displacements to occur between parts without damaging the mating surfaces of components. As illustrated, the multi-layer component 170 is used in two locations, between the surfaces of an exhaust manifold and bracket, and a bracket and the flange nuts used to join the components together.

Figure 10:
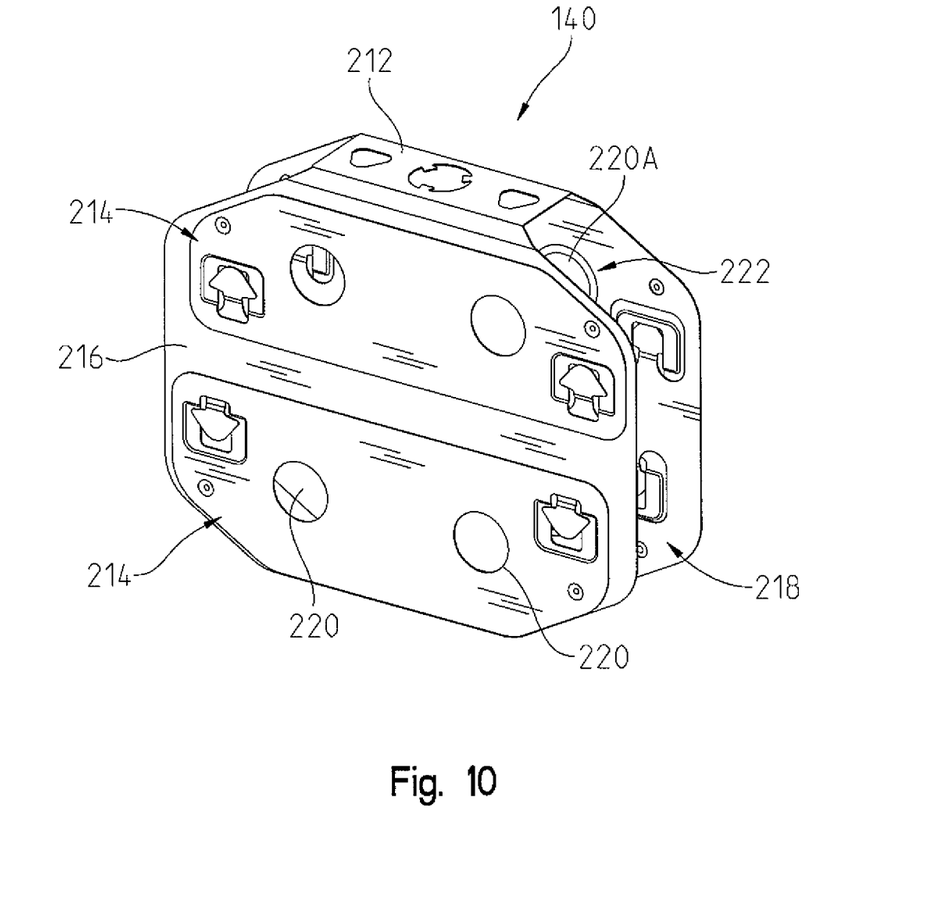
FIG. 10 is a perspective view of another embodiment of a coupler.

Clamp load and joint development are a fundamental part of controlling the amount of relative movement that can occur between components. Too much of a clamp load can lead to the sliding layer not functioning properly, and too little of a clamp load can lead to joint instability which can lead to a loss of system stiffness and component failures. FIG. 10 illustrates another embodiment of the coupler 140 including a sleeve 212 including tabs and locating apertures configured to receive a plurality of sliding elements 214, two of which are illustrated on a first wall 216 of the sleeve 212. Two additional sliding elements 214 are situated at a second wall 218 of the sleeve 212. In this embodiment, two of the sliding elements 214 interface with one of the first wall 216 and the second wall 218. Each of the sliding elements 214 are separate parts and move independently during expansion and contraction of heating or cooling of engine system components, including the exhaust manifold 128. Each of the sliding elements includes one or more apertures 220 which are smaller than corresponding apertures 222. For instance, an aperture 220A is slightly smaller than the aperture 220 such that a fastener extending through the aperture 220A contacts the sliding element. Due to this difference in size of the apertures 220 and 222, thermal expansion or contraction cause the sliding element 220 to move with movement of the fastener. By this contact, the sliding movement at the interface is enhanced. In one embodiment, the apertures 220 are sufficient to receive the fastener, but significantly larger than a diameter of the fastener shaft, such that movement of the sliding elements 214 about the fastener is limited.

Figure 11:
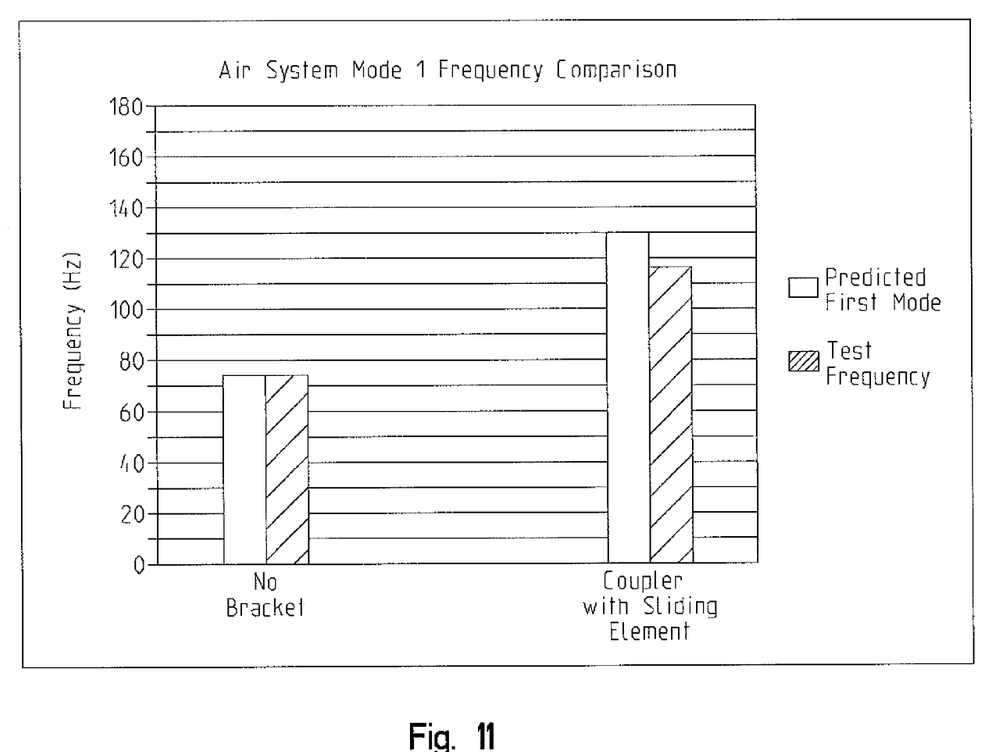
FIG. 11 is a graphical representation of a frequency comparison in an engine system without a bracket and an engine system including a bracket and coupler with a sliding element.

FIG. 11 illustrates a graphical representation of an engine system frequency comparing the frequency of an engine system without a bracket and an engine system including a bracket and coupler with a sliding element. The illustrated frequencies were determined at with an engine operating at 2100 revolutions per minute. As seen in FIG. 11, both a predicted frequency and resulting test frequency for a first mode harmonic are shown. Without a bracket, the first mode in both the predicted and tested results occurred at about 72 Hertz. With the coupler, however, the predicted first mode frequency results occurred at about 130 Hertz and the tested frequency results occurred at about 118 Hertz. As shown by the graph, the decoupling of engine system components illustrates that the engine system resonant frequency with respect to engine firing frequencies has been improved. The increased resonant frequency decreases air system vibration displacements, thereby reducing stresses in components to mitigate vibration related failures. The sliding element allows for increased thermal relative displacements between components, reducing component thermal stress and resulting in a reduced the risk of thermal fatigue related failures.

While exemplary embodiments incorporating the principles of the present invention have been disclosed herein, the present invention is not limited to the disclosed embodiments. Instead, this application is intended to cover any variations, uses, or adaptations of the invention using its general principles. For instance, the present disclosure is applicable to locations where relative displacements between parts is advantageous, while still achieving robust designs at the joint of or interface between parts. In the absence of the teachings of this disclosure, other less robust methodologies would be required which generally do not enable relative displacements to occur. Consequently in those less robust methodologies, parts or components are joined together in a way that prevents relative movement between those parts of components, thereby leading to high risk of component failures due to elevated component strains. Therefore, this application is intended to cover such departures from the present disclosure as come within known or customary practice in the art to which this invention pertains.

The invention claimed is:

1. A coupler for coupling a support bracket to an exhaust manifold of an engine system with one or more fasteners, the coupler comprising:
a sleeve including:
a first surface, a second surface, and a first plurality of apertures configured to provide through access from the first surface to the second surface, wherein each of the first plurality of apertures is configured to receive at least one of the fasteners;
one of a locator aperture and a locator, wherein the locator is configured to engage the locator aperture;
a first side wall, a second side wall, and an end portion disposed therebetween, wherein each of the first side wall and the second side wall includes one of the locator aperture and the locator, wherein the first side wall is displaced from the second side wall a distance sufficient to define a space, wherein the space is configured to receive a portion of the support bracket;
a sliding element including a second plurality of apertures, wherein the sliding element is configured be in sliding contact with the first surface of the sleeve such that the second plurality of apertures is disposed adjacently to the first plurality of apertures, wherein the sliding element includes the other of the locator aperture and the locator.

2. The coupler of claim 1 wherein the sliding element includes a support portion and contact portion, wherein the contact portion includes a first material dissimilar from a second material of the support portion, wherein the first material has a coefficient of friction lower than a coefficient of friction of the second material.

3. The coupler of claim 2 wherein the sliding element includes a first side, upon which the contact portion is disposed, and a second side, the second side being configured to be disposed adjacently to the exhaust manifold and the first side being configured to be disposed adjacently to the first surface of the sleeve.

4. The coupler of claim 3 wherein at least one of the first plurality of apertures is the substantially the same size as an associated one of the second plurality of apertures.

5. The coupler of claim 3 wherein at least one of the second plurality of apertures of the sliding element is larger than an associated one of the first plurality of apertures.

6. The coupler of claim 1 wherein the sliding element includes a first sliding element configured to slidingly engage the first surface of the first side wall and a second sliding element configured to slidingly engage the first surface of the second side wall.

7. The coupler of claim 6 wherein the end portion includes a hole configured to receive a connector, wherein the connector fixedly locates the coupler with respect to support bracket.

8. The coupler of claim 7 wherein each of the first side wall and the second side wall includes at least one of a depression and a protrusion and each of the first and second sliding elements includes the other of the depression and the protrusion.

* * * * *